(12) United States Patent
Rowlands et al.

(10) Patent No.: US 8,812,660 B2
(45) Date of Patent: Aug. 19, 2014

(54) WORKFLOW PROCESSES AND SYSTEMS

(75) Inventors: Lee Rowlands, Ladera Ranch, CA (US); Atish Das, Chino Hills, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 288 days.

(21) Appl. No.: 13/163,801

(22) Filed: Jun. 20, 2011

(65) Prior Publication Data
US 2012/0324074 A1 Dec. 20, 2012

(51) Int. Cl.
*G06F 15/173* (2006.01)
(52) U.S. Cl.
USPC ............................ 709/224; 717/109; 718/100
(58) Field of Classification Search
USPC .......................................................... 709/223
See application file for complete search history.

(56) References Cited

U.S. PATENT DOCUMENTS

| | | | | |
|---|---|---|---|---|
| 6,003,011 A | * | 12/1999 | Sarin et al. | 705/7.26 |
| 7,945,589 B1 | * | 5/2011 | Weiss et al. | 707/795 |
| 2002/0106070 A1 | * | 8/2002 | Elsey et al. | 379/218.01 |
| 2002/0170035 A1 | * | 11/2002 | Casati et al. | 717/127 |
| 2002/0195781 A1 | * | 12/2002 | Jones, Jr. et al. | 280/19 |
| 2004/0216084 A1 | * | 10/2004 | Brown et al. | 717/102 |
| 2005/0216555 A1 | * | 9/2005 | English et al. | 709/204 |
| 2007/0094248 A1 | * | 4/2007 | McVeigh et al. | 707/4 |
| 2008/0134201 A1 | * | 6/2008 | von Helmolt et al. | 719/313 |
| 2008/0196027 A1 | * | 8/2008 | Hohmann et al. | 718/100 |
| 2008/0270212 A1 | * | 10/2008 | Blight et al. | 705/8 |
| 2009/0113065 A1 | * | 4/2009 | Colarik | 709/230 |
| 2009/0249290 A1 | * | 10/2009 | Jenkins et al. | 717/109 |
| 2011/0307856 A1 | * | 12/2011 | Klaka et al. | 717/104 |

OTHER PUBLICATIONS

WFMVC, "Workflow Managemenet Coalition The Workflow Reference Model", WFMC, Jan. 1995, all pages.*

* cited by examiner

*Primary Examiner* — Hua Fan

(57) ABSTRACT

A federation of workflow management systems and corresponding method. A method includes maintaining a master workflow process definition in a first workflow management system. The method includes publishing the master workflow process definition to an object directory services server. The method includes importing a replica workflow process definition, corresponding to the master workflow process definition, to a second workflow management system. The method includes modifying the master workflow process definition to produce an updated master workflow process definition. The method includes sending an updated replica workflow process definition, corresponding to the updated master workflow process definition, to the second workflow management system.

16 Claims, 4 Drawing Sheets

WORKFLOW PROCESSES AND SYSTEMS

TECHNICAL FIELD

The present disclosure is directed, in general, to computer-aided design, visualization, and manufacturing systems, product lifecycle management ("PLM") systems, and similar systems, that perform workflow management functions (collectively, "Workflow Management Systems" or WMS).

BACKGROUND OF THE DISCLOSURE

Workflow management systems include systems that define, create, and manage the execution of workflows through the use of software, running on one or more workflow engines, which is able to interpret the process definition, interact with workflow participants and, where required, invoke the use of IT tools and applications. Improved systems are desirable.

SUMMARY OF THE DISCLOSURE

Various embodiments include a federation of workflow management systems and corresponding method. A method includes maintaining a master workflow process definition in a first workflow management system. The method includes publishing the master workflow process definition to an object directory services server. The method includes importing a replica workflow process definition, corresponding to the master workflow process definition, to a second workflow management system. The method includes modifying the master workflow process definition to produce an updated master workflow process definition. The method includes sending an updated replica workflow process definition, corresponding to the updated master workflow process definition, to the second workflow management system.

The foregoing has outlined rather broadly the aspects and technical advantages of the present disclosure so that those skilled in the art may better understand the detailed description that follows. Additional aspects and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Various embodiments include systems, methods, and computer program products for managing distribution, management, accessibility, ownership, and synchronization of Workflow Process Templates within and between a plurality of cooperating workflow management systems.

Various embodiments improve the management and integrity of shared Workflow Process Definitions (WPDs) when multiple networked cooperating Workflow Management Systems need to share and use common WPDs. Once a WPD is shared it can be used in its entirety for invocation of executing Workflow Process Instances at that WMS without any dependence on the availability of the other WMSs in the system. That is, in various embodiments, the fact of whether a WPD is a master or replica has no bearing on the use of the WPDs to define workflow process execution for any of the WMSs. This provides a significant advantage over techniques that allow address partial sharing of a WPD for partial one-off execution at remote sites. Disclosed embodiments enable the WPD to be used like a local WPD for creating and executing workflow instances in their entirety, and they can be used repeatedly instead of on a one-off, ad hoc basis.

As used herein, a WPD defines the automation of a business process, and the various process activities, procedural rules, and associated control data used to manage the workflow during process enactment. The workflow describes the automation of a business process, in whole or part, during which documents, information, or tasks are passed from one participant to another for action, according to a set of procedural rules. A WMS is a system that defines, creates, and manages the execution of workflows through the use of software, running on one or more workflow engines, which is able to interpret the process definition, interact with workflow participants and, where required, invoke the use of IT tools and applications. Other concepts and terms are defined by the Workflow Management Coalition document "WFMC-TC-1011 Ver 3 Terminology and Glossary English" (Issue 3.0, Aug. 17, 2008), available at time of filing from www.wfmc.org and hereby incorporated by reference.

Figure 1:
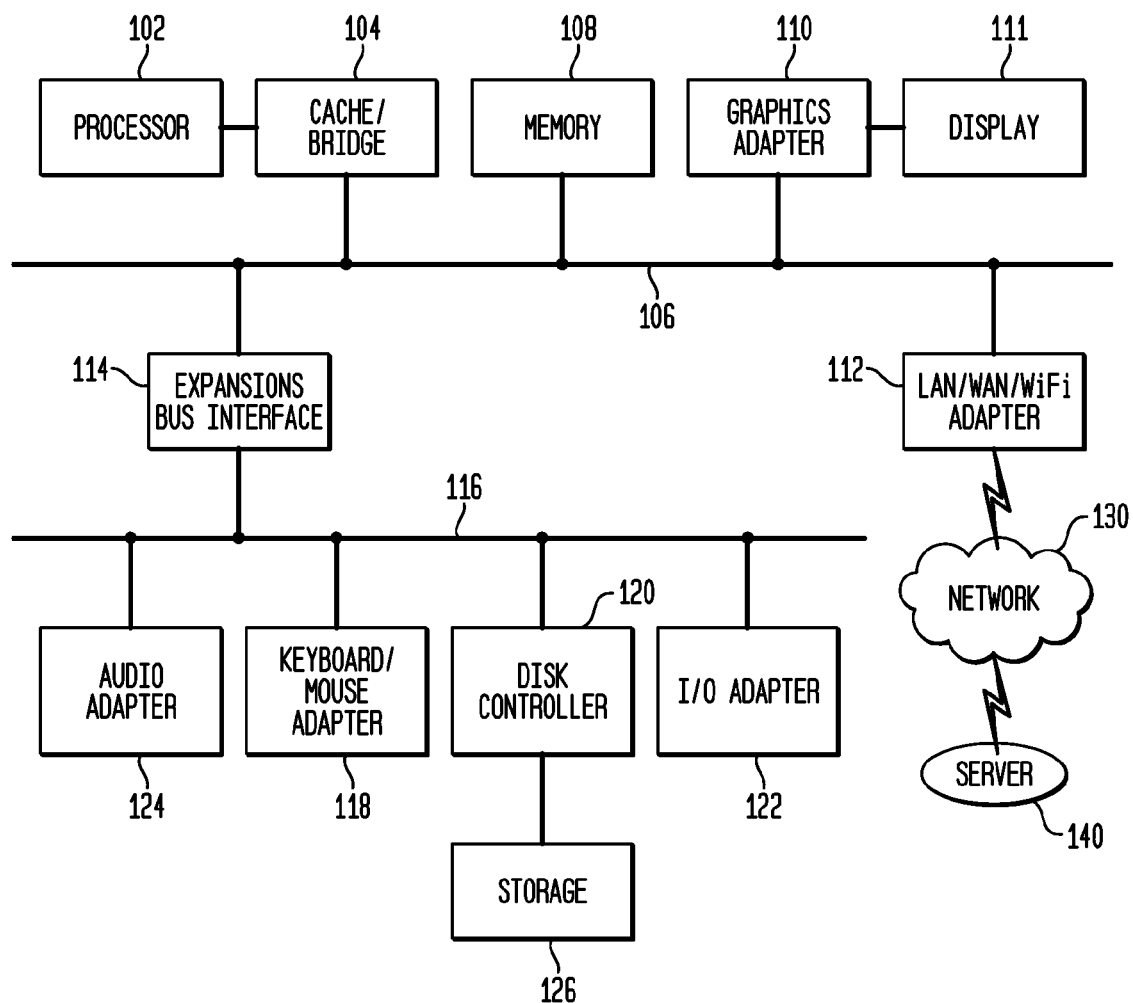
FIG. 1 depicts a block diagram of a data processing system in which an embodiment can be implemented.

FIG. 1 depicts a block diagram of a data processing system in which an embodiment can be implemented, for example as a WMS particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
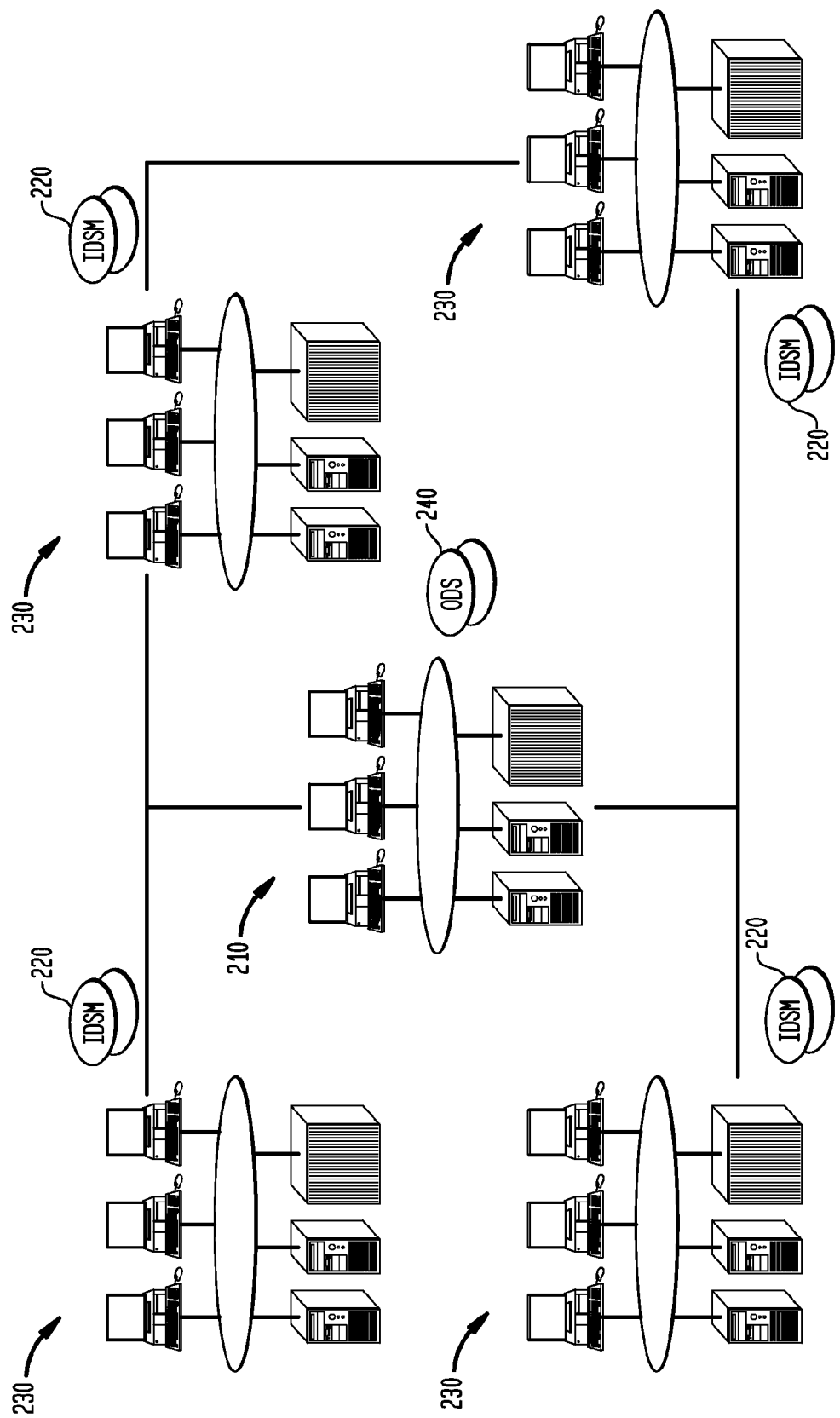
FIG. 2 depicts an example of networked cooperating Workflow Management Systems in accordance with disclosed embodiments.

FIG. 2 depicts an example of networked cooperating Workflow Management Systems, referred to herein as a "federation" of systems. This figure shows multiple integrated distributed service manager (IDSM) systems 220, each of which is connected to communicate with each other over network 210, which can be any public or private network including the Internet. Each IDSM can communicate with one or more client systems 230, and acts as a workflow management site. Each IDSM can also communicate with one or more object directory services (ODS) server 240, also connected to network 210.

As used herein, an IDSM system 220 is a service or system that processes remote transfer requests and various other remote service requests on behalf of a remote user. An ODS server 240 is a server which processes publication requests and location queries. These systems work together to perform workflow management functions for users of workflow management sites/IDSMs 220 (or the respective client systems), and can manage workflow process definitions as described herein.

The cooperating WMSs often have a subset of common WPDs and can benefit from sharing the WPDs as opposed to creating from each of them from scratch at each WMS. Disclosed embodiments provide a uniform process that ensures that shared WPDs stay in sync and controls which WMS has edit access to the WPD at any one time, and thereby assures the integrity of the WPDs.

When multiple networked cooperating Workflow Management Systems, or their attached client systems, need to share and use common WPDs, systems and methods described herein manage the integrity of those shared WPDs. Once the WPD is shared it can be used in its entirety for invocation of executing Workflow Process Instances at that WMS without any dependence on the availability of the other WMS in the federation.

The environment where this invention is applicable is where we have a Workflow Management System installation typically with its own database, for example at a WMS site, that is autonomous but does cooperate and exchange data with one or more other WMS sites.

According to various embodiments, for the sharing and management of the WPDs within the federation, an exemplary implementation can include the following components:

Site—each site represents an independent database with its own set of client system users and groups, data model, business rules, and business processes.

WPD sharing—is accomplished via object replication wherein a copy of the WPD is made at a remote site. The replica understands that it is a copy or not by means of an owning site attribute. Replicas are synchronized when the master copy is modified. A replica is a smart copy as it understands which site owns it and by the federation following a set of rules in distributing and managing replicas we can improve the management and integrity of that shared data. One rule can specify that only one site can own the master copy at any given time. Another rule can specify that the master copy can only be modified at the owning site.

Another rule can specify that the master copy keeps an export record of each site that has a copy so that it knows which sites should get synced when an update is processed. Each export record can contain the site ID of each target site and the date of the last export to that site. Export records can be associated (and stored) with the master object.

Another rule can specify that only the master object can be replicated, so that a user or system cannot replicate replicas. Another rule can specify that when a user or system exports an object, the sites authorized to import it must be specified.

Another rule can specify that ownership can be atomically transferred from site to site. Another rule can specify that after it is replicated, a master object cannot be deleted until all replicas are deleted.

According to various embodiments, there are a number of operations that can be performed by a WMS site on its data.

For example, a site can perform a Publish operation. A user at owning site publishes to the ODS an object to be shared by other sites. The ODS server creates a publication record at ODS database.

A site can perform an UnPublish operation. A user at owning site requests unpublish from the ODS on an object no longer to be shared with other sites. The ODS server removes its publication record for this object in the ODS database.

A site can perform a Search operation. Users from remote sites can search for data published from other sites and can request a remote import. The users can search using various criteria stored in ODS records such as the WPD name.

A site can perform a Remote Import operation. A user at a remote site selects from the search results the object(s) to be replicated and initiates remote import (pull).

A site can perform a Remote Export operation. A user at owning site selects a remote site that a replica is to be pushed to, and the replica is pushed from the owning site to the target site (push).

A site can perform a Transfer Ownership operation. As long as a requesting user satisfies any access rules, the user may be able to request transfer of ownership as a setting on the remote import operation or directly on an existing replica A site can perform a Synchronize operation. This operation can be initiated from owning site, to push updates to all sites that have a replica, as determined from any export records. This operation can be also initiated from a remote site that has a replica, to pull an update from the owning site. This operation can be performed at set intervals or on demand.

Figure 3:
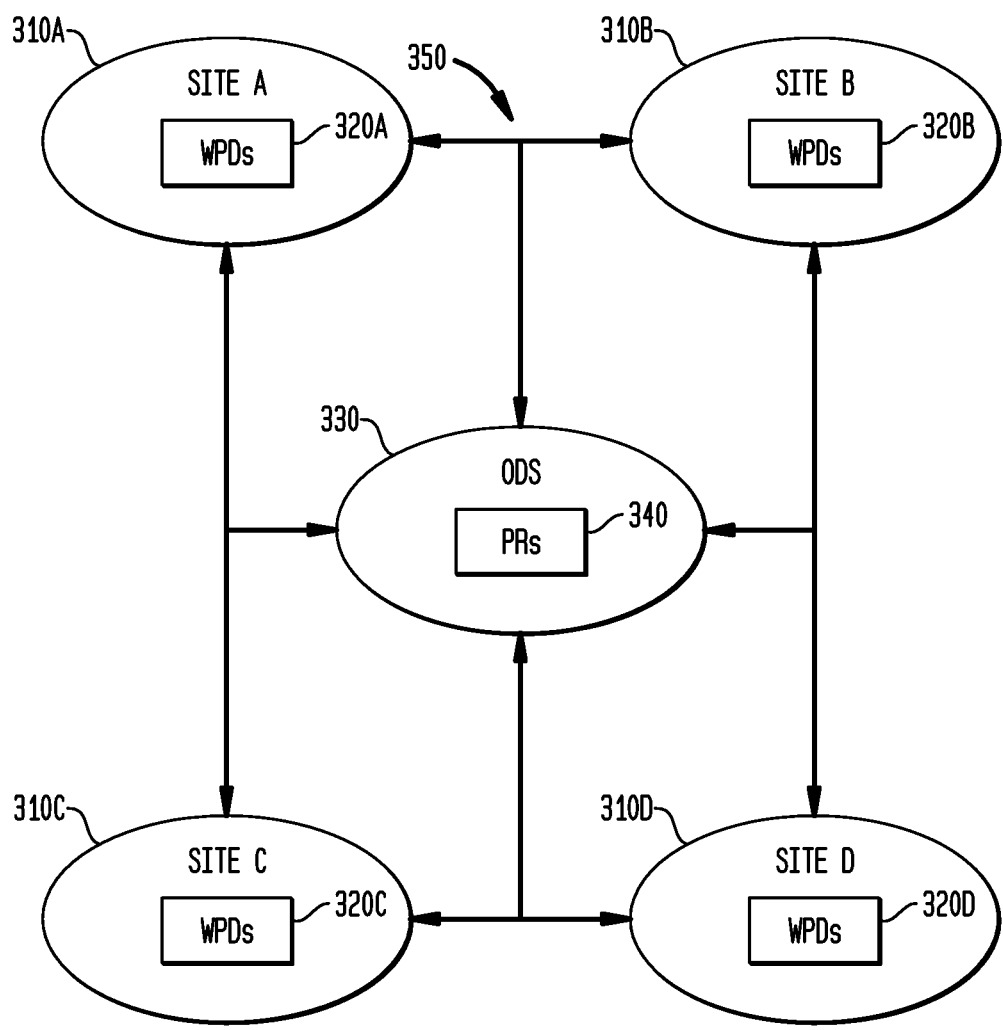
FIG. 3 shows a block diagram of a federation of several WMS sites, in accordance with disclosed embodiments.

FIG. 3 shows a block diagram of a federation of several WMS sites including site A 310A (that can store WPDs 320A), site B 310B (that can store WPDs 320B), Site C 310C (that can store WPDs 320C), and Site D 310D (that can store WPDs 320D), all in communication with an ODS 330. ODS 330 can store publication records (PRs) 340. Each WMS and the ODS is connected to a network 350, which can be any public or private network. This diagram will be used as a basis for the several examples described below. Of course, in various implementations, there may be more or fewer of each of these elements. In this example, these four sites are configured to cooperate in sharing WPDs and the ODS 330.

In a first phase, consider that Site A 310A stores and maintains three WPDs 320A, and Site B 310B stores one WPD 320B:
WPDs 320A
A-Definition1:1 (Definition 1, version 1, owned by site A)
A-Definition2:2 (Definition 2, version 2, owned by site A)
A-Definition4:1 (Definition 4, version 1, owned by site A)
WPDs 320B
B-Definition3:1 (Definition 3, version 1, owned by site B)

In this first phase, Site C 310C and Site D 310D have no WPDs, and the ODS has no publication records since nothing has been published yet.

In a second phase, referencing the basic first phase, assume that Site A 310A publishes its Definition 1 and Definition 2. These are published to the ODS 330, which enters them in its publication records 340. Site A can also keep a Publish Audit Record (PAR) so that at the owning site the WPD knows if it has been published or not. Definition 4 is not published and is therefore not visible to ODS or other sites Also in the second phase, Site B 310B publishes its Definition 3 to the ODS 330, which enters it in its publication records 340. Site B can also keep a Publish Audit Record (PAR) so that at the owning site the WPD knows if it has been published or not. The PR at ODS 330 is now storing:
ODS 330 Publication Record
A-Definition1:1 (Definition 1, version 1, owned by site A)
A-Definition2:2 (Definition 2, version 2, owned by site A)
B-Definition3:1 (Definition 3, version 1, owned by site B)

In a third phase, each of the four sites searches for WPDs at the ODS 300 and imports some or all of them for use at their own site. Site A owns 3 WPDs, Definition1 (version1), Definition 2 (version 2), and Definition 4 (version1). B-Definition3:1 is found via the ODS and imported to Site A 310A. It is the only replica WPD at Site A 310A.

Site B 310B owns one WPD, B-Definition3:1. A-Definition1:1 and A-Definition2:2 are found via the ODS 330 and imported to Site B 310B. Definition 1 and 2 are replica WPDs at site B.

Site C 310C owns no WPD but found via the ODS 330 and imported to Site C 310C A-Definition1:1, A-Definition2:2, and B-Definition3:1. All WPDs at site C 310C are replicas.

Site D 310D owns no WPD but found via the ODS 330 and imported to Site C 310D A-Definition1:1, and B-Definition3:1. All WPDs at site C 310D are replicas.

Each time a site imports a WPD the owning site of the WPD can add an Export Record (ER) to the "master" WPD object (the non-replica WPD), so that the master WPD can keep track of all sites that have a copy what date and time the copy was made and then use this information in determining what sites need updates when a modification is made to the master copy at the owning site. So, for example, at this point the WPDs would have the following export records:
A-Definition1:1—ERs for Sites B, C and D
A-Definition2:2—ERs for Sites B and C
B-Definition3:1—ERs for Sites A, C and D
A-Definition4:1—has no ERs as it is not published or remote imported A fourth phase is used to illustrate synchronization. In a fourth phase, A=Definition2:2 is modified and saved creating a newer version A=Definition2:3, and the owning site decides to synchronize this update with the sites that have a replica. At this time. The Definition2 updates are shared with other sites and ODS. Looking at the ER's owning Site 310A determines that Site B and C will need updated replicas and as there is a PAR (indicating that Definition2 has been published), owning Site 310A also determines that it also needs to update the ODS 330.

Site B 310B gets an updated Definition 2 (A-Definition2:3) from Site A 310A due to the synchronization triggered by Site A 310A (push). Note that Site B 310B could have alternately requested a synchronization on Definition 2 (pull).

Site C 310C gets an updated Definition 2 (A-Definition2:3) from Site A 310A due to the synchronization triggered by Site A 310A (push).

Site D was not impacted by the Synchronization as it did not have a replica of Definition 2 in the first place.

The ODS 330 is also updated replacing the PR for A-Definition2:2 with a PR record for A-Definition2:3 so that only the latest versions are shared with any site yet to search and remote import.

A WMS can determine if a remote site needs its replica to be updated in response to a synchronization request by comparing a last modification date of the master WPD to the last export or import date of the replica WPD. If the modification date of the master WPD is later than the last export/import date for the replica WPD, the replica WPD needs to be updated or replaced with the newer master WPD.

A fourth phase is used to illustrate a remote export, which is a transfer of WPD without publication. Note that at this point, in this example, the WPD 320A at Site A 310A is as follows:

WPDs 320A
A-Definition1:1 (Definition 1, version 1, owned by site A)
A-Definition2:3 (Definition 2, version 3, owned by site A)
A-Definition4:1 (Definition 4, version 1, owned by site A)
B-Definition3:1 (Definition 3, version 1, owned by site B)

A-Definition4:1 is not published so there is no PR record for it at the ODS 330 and other sites cannot pull a copy of it. The owning site can push a copy of it, however, via Remote Export directly to other sites. Assume that Site A 310A owns A-Definition4:1, but chooses not to publish it as it doesn't want to make the template generally available for others to pull a copy. Instead, Site A 310A wants to just push a copy to Site B 310B.

Site B 310B gets a replica of A-Definition4:1 from Site A 310A. Site C 310C has no changes. Site D 310D has no changes. The ODS 330 also has no changes in such a case since there is no ODS PR record for A-Definition4:1.

A fifth phase is used to illustrate a Transfer Ownership process. In this example, Site A 310A pushes a transfer of Ownership of Definition 2 WPD to Site C.

Site A owns A-Definition2:3, but chooses to push a transfer of Ownership of A-Definition2:3 WPD to Site C. The other sites that have replicas, determined from the ERs, and the ODS are also updated about this ownership change.

Site B gets updated replica of A-Definition2:3, as C-Definition2:3, that reflects that site C owns the master copy. Site C is now the owner of the Master copy of C-Definition2:3. Site D no changes as it does not have a replica of A-Definition2:3. The ODS PR Record for A-Definition2:3 is updated to C-Definition2:3 to reflect that site C owns the master copy.

A sixth phase is used to illustrate an Unpublish process. In this case Site B Unpublishes B-Definition3:1. Site A 320A, Site B 320B, and Site C 320C each have a replica of B-Definition3:1, but have no impact from the unpublication.

Site B 310B is the owner of B-Definition3:1 and triggers the Unpublish; at this time it will remove B-Definition3:1 PR from the ODS 330 and remove the PAR associated with the master object B-Definition3:1 at Site B 310B. Existing sites that have a replica of B-Definition3:1 are unaffected. If a new site were to be added to the federation they would no longer be able to see B-Definition3:1 via a Remote Search making it harder for them to pull a replica via Remote Import. The ODS 330 PR Record for B-Definition3:1 is removed.

Figure 4:
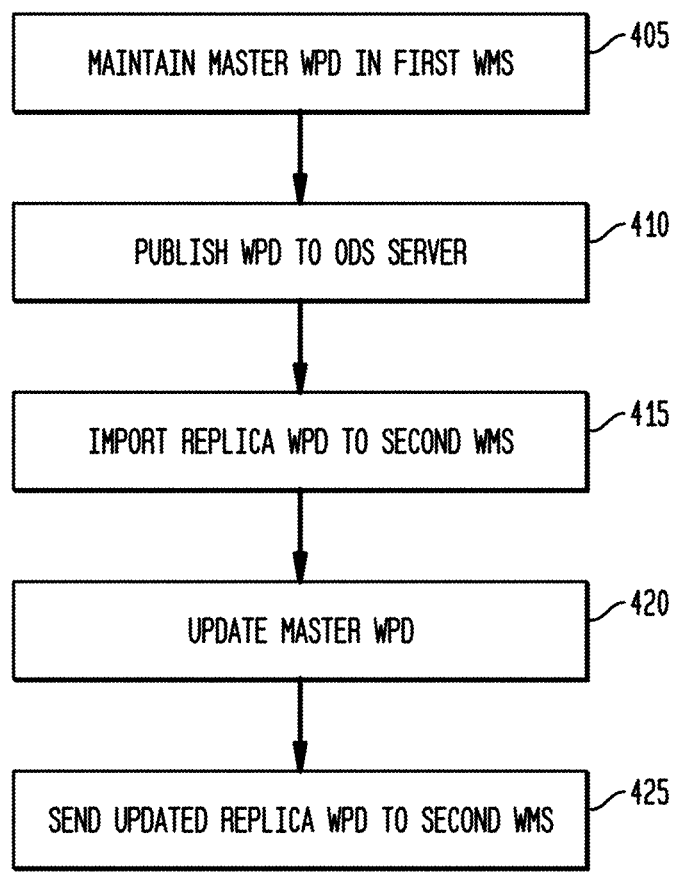
FIG. 4 depicts a flowchart of a process in accordance with disclosed embodiments.

FIG. 4 depicts a flowchart of a process in accordance with disclosed embodiments, reflecting various actions that can be performed in a system as disclosed herein.

In the exemplary process of FIG. 4, there are at least two workflow management system sites that are typically (but not necessarily) geographically remote from each other. Each site has a WMS that can be implemented as a data processing system 100 and stores, maintains, and communicates workflow process definitions as described herein. A third workflow management system site, which also can be implemented as data processing system 100, acts as an ODS. Those of skill in the art will recognize that the ODS can be physically implemented at the same location or even on the same hardware as a WMS in various embodiment, and the designation as a WMS or ODS refers to the functions and operations performed by a configured data processing system, not to any specific hardware. This example deals with a single WPD and its replica WPDs.

A first workflow management system maintains a master workflow process definition (step 405).

The first WMS publishes the master WPD to an object directory services server (step 410). As part of this step, the first WMS can store a publish audit record corresponding to the master WPD, and the ODS server can store a publication record corresponding to the master WPD. The ODS server can also store a replica WPD of the master WPD.

A second WMS imports a replica WPD of the master WPD (step 415). This step can include the second WMS searching for the publication record of the ODS server, and can include receiving the replica WPD from the first WMS or from the ODS server. This step can include the first WMS creating an export record associated with the master WPD that indicates that the second WMS has a replica WPD.

The first WMS updates or otherwise modifies the master WPD (step 420). This step can include creating a new master WPD in place of the original master WPD.

The first WMS sends an updated replica WPD, corresponding to the updated master WPD, to the second WMS (step 425). This can be performed according to the export record. This step can also include updating the publication record in the ODS to reference the updated master WPD.

This process provides on example of the maintenance, publication, distribution, and synchronization of WPDs between two WMSs. Of course, in other embodiments, a greater number of WMSs and WPDs will be likewise manipulated, and the other processes described above can also be performed.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a federation of workflow management systems, comprising:
    maintaining a master workflow process definition in a first workflow management system, wherein the first workflow management system creates an export record corresponding to the master workflow process definition;
    publishing the master workflow process definition to an object directory services server;
    importing a replica workflow process definition, corresponding to the master workflow process definition, by a second workflow management system, wherein the replica workflow process definition identifies the first workflow management system and includes an owning site attribute that identifies the replica workflow process definition as a copy, wherein the master workflow process definition includes the export record, and wherein the export record identifies the second workflow management system and the date and time the replica workflow process definition was imported by the second workflow management system and identifies at least one other workflow management system that has received the replica workflow process definition;
    modifying the master workflow process definition to produce an updated master workflow process definition; and
    sending an updated replica workflow process definition, corresponding to the updated master workflow process definition, to the second workflow management system based on the time and date identified by the export record in the master workflow process definition and according to a last modification date of the master workflow process definition, wherein the first workflow management system, the second workflow management system, and the object directory services server are each implemented in at least one hardware data processing system.

2. The method of claim 1, wherein the first workflow management system stores a publish audit record corresponding to the master workflow process definition.

3. The method of claim 1, wherein the object directory services server also stores a replica workflow process definition corresponding to the master workflow process definition.

4. The method of claim 1, wherein modifying the master workflow process definition includes producing an updated master workflow process definition that replaces the master workflow process definition.

5. The method of claim 1, wherein the second workflow management system imports the replica workflow process definition from object directory services server.

6. The method of claim 1, wherein the second workflow management system imports the replica workflow process definition from the first workflow management system.

7. The method of claim 1, wherein the object directory services server stores a publication record corresponding to the master workflow process definition.

8. The method of claim 7, wherein the publication record in the object directory services server is updated to reference the updated master WPD.

9. A federation of workflow management systems comprising:
    a first workflow management system having at least a processor and accessible memory;
        a second workflow management system having at least a processor and accessible memory and connected to communicate with the first workflow management system; and
        an object directory services server having at least a processor and accessible memory and connected to communicate with the first workflow management system and the second workflow management system, wherein the federation of workflow management systems is configured to
        maintain a master workflow process definition in the first workflow management system, wherein the first workflow management system creates an export record corresponding to the master workflow process definition;
        publish the master workflow process definition to the object directory services server;
        import a replica workflow process definition, corresponding to the master workflow process definition, to the second workflow management system, wherein the replica workflow process definition identifies the first workflow management system and includes an owning site attribute that identifies the replica workflow process definition as a copy, wherein the master workflow process definition includes the export record, and wherein the export record identifies the second workflow management system and the date and time the replica workflow process definition was imported by the second workflow management system and identifies at least one other workflow management system that has received the replica workflow process definition;
        modify the master workflow process definition to produce an updated master workflow process definition; and
        send an updated replica workflow process definition, corresponding to the updated master workflow process definition, to the second workflow management system based on the time and date identified by the export record in the master workflow process definition and according to a last modification date of the master workflow process definition.

10. The federation of workflow management systems of claim 9, wherein the first workflow management system stores a publish audit record corresponding to the master workflow process definition.

11. The federation of workflow management systems of claim 9, wherein the object directory services server also stores a replica workflow process definition corresponding to the master workflow process definition.

12. The federation of workflow management systems of claim 9, wherein modifying the master workflow process definition includes producing an updated master workflow process definition that replaces the master workflow process definition.

13. The federation of workflow management systems of claim 9, wherein the second workflow management system imports the replica workflow process definition from object directory services server.

14. The federation of workflow management systems of claim 9, wherein the second workflow management system imports the replica workflow process definition from the first workflow management system.

15. The federation of workflow management systems of claim 9, wherein the object directory services server stores a publication record corresponding to the master workflow process definition.

16. The federation of workflow management systems of claim 15, wherein the publication record in the object directory services server is updated to reference the updated master WPD.

\* \* \* \* \*